(12) United States Patent
Kovalenko

(10) Patent No.: US 9,137,377 B2
(45) Date of Patent: Sep. 15, 2015

(54) SYSTEMS AND METHODS FOR AT LEAST PARTIALLY RELEASING AN APPLIANCE FROM A PRIVATE BRANCH EXCHANGE

(75) Inventor: Andrey Kovalenko, Union City, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 1327 days.

(21) Appl. No.: 11/843,514

(22) Filed: Aug. 22, 2007

(65) Prior Publication Data

US 2009/0052640 A1 Feb. 26, 2009

(51) Int. Cl.
| | |
|---|---|
| *H04Q 3/62* | (2006.01) |
| *H04L 12/28* | (2006.01) |
| *H04L 12/66* | (2006.01) |
| *H04M 7/00* | (2006.01) |
| *H04M 3/50* | (2006.01) |
| *H04M 3/42* | (2006.01) |
| *H04M 3/493* | (2006.01) |

(52) U.S. Cl.
CPC ............... *H04M 7/003* (2013.01); *H04M 3/50* (2013.01); *H04M 7/009* (2013.01); *H04M 3/42323* (2013.01); *H04M 3/4935* (2013.01); *H04M 2203/2016* (2013.01); *H04M 2203/2022* (2013.01)

(58) Field of Classification Search
CPC ............. H04M 2203/2016; H04M 2203/2022; H04M 3/4935
See application file for complete search history.

(56) References Cited

U.S. PATENT DOCUMENTS

| | | | |
|---|---|---|---|
| 5,375,200 A | 12/1994 | Dugan et al. | |
| 5,408,261 A * | 4/1995 | Kamata et al. | ............. 348/14.09 |
| 5,408,659 A | 4/1995 | Cavendish et al. | |
| 5,446,902 A | 8/1995 | Islam | |
| 5,522,025 A | 5/1996 | Rosenstein | |
| 5,668,997 A | 9/1997 | Lynch-Freshner et al. | |
| 5,903,631 A | 5/1999 | Smith et al. | |
| 6,040,832 A | 3/2000 | Poreh et al. | |
| 6,262,735 B1 | 7/2001 | Etelapera | |
| 6,285,364 B1 | 9/2001 | Giordano et al. | |
| 6,363,065 B1 | 3/2002 | Thornton et al. | |
| 6,427,233 B1 | 7/2002 | Lee et al. | |
| 6,539,077 B1 | 3/2003 | Ranalli et al. | |
| 6,750,858 B1 | 6/2004 | Rosenstein | |

(Continued)

FOREIGN PATENT DOCUMENTS

| | | |
|---|---|---|
| CN | 1882006 A | 12/2006 |
| WO | WO-97/13352 | 4/1997 |
| WO | WO 2005060226 A1 * | 6/2005 |

OTHER PUBLICATIONS

Chinese Office Action on 200880103712.9 dated May 31, 2012.

(Continued)

*Primary Examiner* — Wutchung Chu
*Assistant Examiner* — Jason Harley
(74) *Attorney, Agent, or Firm* — Foley & Lardner LLP; Christopher J. McKenna

(57) ABSTRACT

Systems and methods for partially releasing an appliance from a private branch exchange are shown and described. The method can include issuing a path replacement command to the private branch exchange, receiving a facility message from the private branch exchange destined for one end-point of a communications session, and transmitting the received facility message to another end-point of the communications session.

27 Claims, 13 Drawing Sheets

(56) References Cited

U.S. PATENT DOCUMENTS

| | | | |
|---|---|---|---|
| 6,859,928 B2 | 2/2005 | Wright | |
| 6,980,641 B1 | 12/2005 | Stanford et al. | |
| 7,003,327 B1 | 2/2006 | Payne et al. | |
| 7,019,757 B2 | 3/2006 | Brown et al. | |
| 7,221,748 B1 | 5/2007 | Moore et al. | |
| 7,242,680 B2 | 7/2007 | Gallant | |
| 7,284,002 B2 | 10/2007 | Doss et al. | |
| 7,333,976 B1 | 2/2008 | Auerbach et al. | |
| 7,343,365 B2 | 3/2008 | Farnham et al. | |
| 7,441,181 B2 | 10/2008 | Yamada et al. | |
| 7,451,406 B2 | 11/2008 | Yoon | |
| 7,555,108 B2 | 6/2009 | Sylvain | |
| 7,555,555 B2 | 6/2009 | Park et al. | |
| 7,599,351 B2 | 10/2009 | Gallant et al. | |
| 7,600,267 B2 | 10/2009 | Bauchot et al. | |
| 7,650,384 B2 | 1/2010 | Ramanathan et al. | |
| 7,688,817 B2 | 3/2010 | Celi et al. | |
| 7,720,207 B2 | 5/2010 | Stanford et al. | |
| 7,779,072 B2 | 8/2010 | Donovan et al. | |
| 7,840,681 B2 | 11/2010 | Acharya et al. | |
| 7,895,209 B2 | 2/2011 | Spence et al. | |
| 2001/0005382 A1* | 6/2001 | Cave et al. | 370/466 |
| 2001/0018715 A1 | 8/2001 | Stern et al. | |
| 2002/0007374 A1 | 1/2002 | Marks et al. | |
| 2002/0054671 A1 | 5/2002 | Wiener et al. | |
| 2002/0118231 A1 | 8/2002 | Smith et al. | |
| 2002/0130880 A1 | 9/2002 | Holtslag et al. | |
| 2002/0136206 A1 | 9/2002 | Gallant et al. | |
| 2002/0137490 A1 | 9/2002 | Gallant | |
| 2002/0167946 A1 | 11/2002 | Gallant | |
| 2003/0035381 A1* | 2/2003 | Chen et al. | 370/261 |
| 2003/0058266 A1 | 3/2003 | Dunlap et al. | |
| 2003/0058858 A1 | 3/2003 | Berlyoung et al. | |
| 2003/0074647 A1 | 4/2003 | Andrew | |
| 2003/0095542 A1* | 5/2003 | Chang et al. | 370/352 |
| 2003/0142108 A1 | 7/2003 | Brown et al. | |
| 2003/0165140 A1 | 9/2003 | Tang et al. | |
| 2004/0095401 A1 | 5/2004 | Tomimori | |
| 2004/0165713 A1* | 8/2004 | Leighton | 379/225 |
| 2004/0239701 A1 | 12/2004 | Crichton | |
| 2005/0057498 A1 | 3/2005 | Gentle | |
| 2005/0117737 A1 | 6/2005 | Stanford et al. | |
| 2005/0125543 A1 | 6/2005 | Park et al. | |
| 2005/0152528 A1* | 7/2005 | Newman et al. | 379/229 |
| 2005/0278626 A1 | 12/2005 | Malik | |
| 2006/0026288 A1 | 2/2006 | Acharya et al. | |
| 2006/0048073 A1 | 3/2006 | Jarrett et al. | |
| 2006/0095397 A1 | 5/2006 | Torres et al. | |
| 2006/0142010 A1* | 6/2006 | Tom et al. | 455/445 |
| 2006/0224989 A1 | 10/2006 | Pettiross et al. | |
| 2007/0021981 A1 | 1/2007 | Cox | |
| 2007/0030245 A1 | 2/2007 | Ngari et al. | |
| 2007/0070981 A1* | 3/2007 | Croak et al. | 370/352 |
| 2007/0143414 A1 | 6/2007 | Daigle | |
| 2007/0201493 A1* | 8/2007 | Yamada et al. | 370/401 |
| 2007/0233891 A1 | 10/2007 | Luby et al. | |
| 2007/0253643 A1 | 11/2007 | Nagarajan | |
| 2008/0031228 A1 | 2/2008 | Gallant | |
| 2008/0059646 A1 | 3/2008 | Ludvig et al. | |
| 2008/0071745 A1 | 3/2008 | Clarke | |
| 2008/0081662 A1 | 4/2008 | Strandell et al. | |
| 2008/0208605 A1* | 8/2008 | Sinha et al. | 705/1 |
| 2008/0256563 A1 | 10/2008 | Han | |
| 2008/0276267 A1 | 11/2008 | Badt et al. | |
| 2008/0281971 A1 | 11/2008 | Leppanen et al. | |
| 2008/0313669 A1 | 12/2008 | Acharya et al. | |
| 2009/0022283 A1 | 1/2009 | Pollitt | |
| 2009/0025042 A1 | 1/2009 | Lubbers et al. | |
| 2009/0044242 A1 | 2/2009 | Ramakrishnan et al. | |
| 2009/0049392 A1 | 2/2009 | Karttunen et al. | |
| 2009/0052639 A1 | 2/2009 | Payne | |
| 2009/0201990 A1 | 8/2009 | Leprovost et al. | |
| 2009/0238174 A1 | 9/2009 | Veenstra et al. | |
| 2009/0265746 A1 | 10/2009 | Halen et al. | |
| 2009/0268720 A1 | 10/2009 | Veenstra et al. | |
| 2010/0141552 A1 | 6/2010 | Ferlitsch et al. | |
| 2011/0047476 A1 | 2/2011 | Hochmuth et al. | |

OTHER PUBLICATIONS

Chinese Office Action on 200880103746.8 dated Aug. 9, 2012.
European Examination Report on 08798180.9 dated Mar. 20, 2012.
Notice of Allowance on U.S. Appl. No. 11/843,513 dated Aug. 3, 2012.
Office Action on U.S. Appl. No. 11/539,515 dated Apr. 11, 2012.
Office Action on U.S. Appl. No. 12/174,881 dated Oct. 23, 2012.
Office Action on U.S. Appl. No. 12/174,881 dated Mar. 5, 2013.
US Office Action on U.S. Appl. No. 11/843,516 dated Jan. 31, 2013.
"Private Integrated Services Network (PISN); Inter-exchange signalling protocol; Path replacement additional network feature [ISO/IEC 13874 (1995) modified]," ETSI European Telecommunication Standard, ETS 300 259, Second Edition, Nov. 1995, 5 pages.
Australian Examination Report on 2007307915 dated Aug. 5, 2011.
Australian Examination Report on 2008289047 dated Apr. 18, 2011.
Bobola, Daniel T., "The Complete Idiot's Guide to Microsoft Word 2000", 1999, pp. 15, 121, 166, 244, 278-281.
International Search Report from PCT/US2008/073586, dated Nov. 18, 2008, 4 pages.
Office Action on U.S. Appl. No. 11/539,515 dated Dec. 20, 2011.
Office Action on U.S. Appl. No. 11/843,516 dated Nov. 7, 2011.
Office Action on U.S. Appl. No. 12/341,779 dated Aug. 2, 2011.
Office Action on U.S. Appl. No. 12/341,797 dated Dec. 5, 2011.
Office Action on U.S. Appl. No. 12/341,809 dated Aug. 3, 2011.
Office Action on U.S. Appl. No. 12/341,919 dated Oct. 11, 2011.
Written Opinion of the International Searching Authority, from PCT/US2008/073586, dated Nov. 18, 2008, 7 pages.
US Notice of Allowance for U.S. Appl. No. 11/843,516 dated Jan. 24, 2014.
US Notice of Allowance U.S. Appl. No. 11 12/174,881 dated Aug. 13, 2013.
US Office Action U.S. Appl. No. 11 11/843,516 dated Aug. 28, 2013.
Non Final Office Action regarding U.S. Appl. No. 11/843,509 mailed on Nov. 23, 2010.
Final Office Action regarding U.S. Appl. No. 12/174,881 mailed on Nov. 24, 2010.
Final Office Action regarding U.S. Appl. No. 11/853,510 mailed on Nov. 26, 2010.
Non Final Office Action regarding U.S. Appl. No. 11/539,515 mailed on Jul. 13, 2011.
Non Final Office Action regarding U.S. Appl. No. 11/843,513 dated Jun. 22, 2011.

* cited by examiner

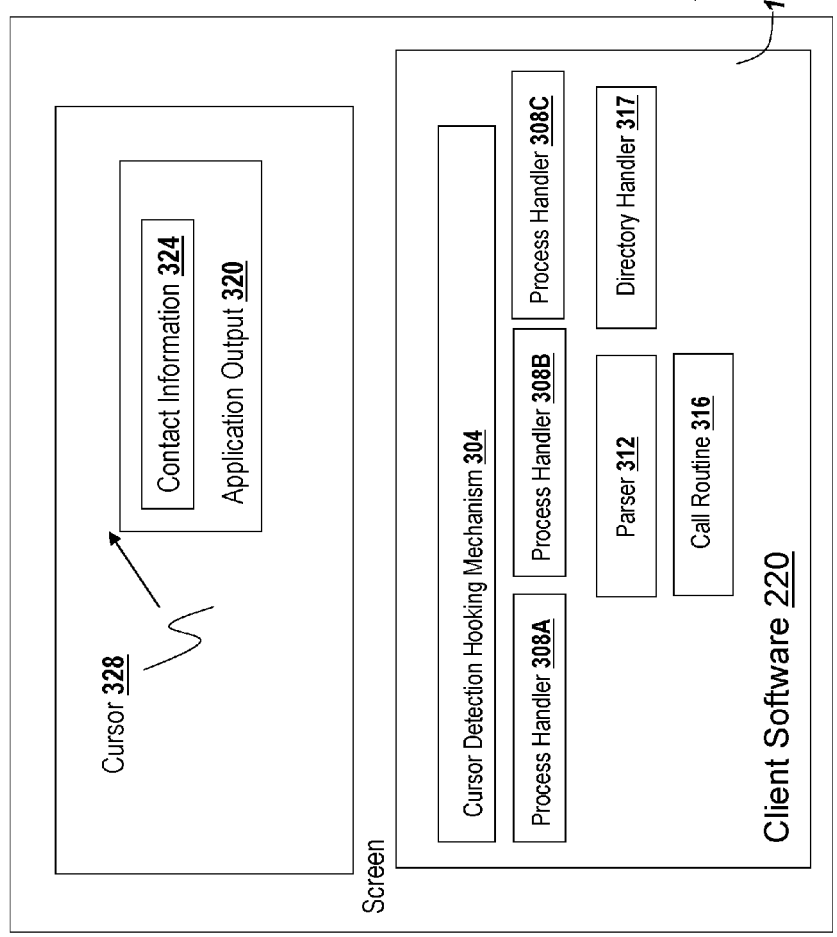

SYSTEMS AND METHODS FOR AT LEAST PARTIALLY RELEASING AN APPLIANCE FROM A PRIVATE BRANCH EXCHANGE

FIELD OF THE INVENTION

This application generally relates to communications sessions. In particular, this application relates to systems and methods for establishing a communications session using a computing device.

BACKGROUND OF THE INVENTION

Various efforts have been made to enable end-users of computing device to establish communications sessions from their computing devices. A number of these efforts have focused on locating, by a web server, telephone numbers within web pages and linking a dialing application to the located telephone numbers. Typically, these services (e.g., a Vonage type service) require a specific software application provided by the service to complete the call. It would be helpful to enable a communication session from any application.

SUMMARY OF THE INVENTION

In one aspect, a method of releasing a communications appliance from a private branch exchange to establish a communication session between two end-points of a network and through the private branch exchange are shown and described. In one embodiment, the method can include issuing a path replacement command to the private branch exchange, receiving a facility message from the private branch exchange destined for one end-point of a communications session, and transmitting the received facility message to another end-point of the communications session.

In one another embodiment, the method includes issuing, by the private branch exchange, a release command to each of the end-points of the communication session. In a further embodiment, issuing a release command can include issuing an ISDN release command.

In another embodiment, the method includes issuing a path replacement command from the communications appliance. Also, the method can include receiving a facility message by the communications appliance.

In another aspect, a method of releasing a communications appliance from the media path portion of a communications session through a private branch exchange is shown and described. In one embodiment, the method includes issuing a first invite command to a first end-point of a first communication session, the invite command comprising a port advertisement of a second communication session, and issuing a second invite command to a second end-point, the second invite command comprising a port advertisement of the first communication session.

In one embodiment, the method includes establishing a communications session between the first end-point and the second end-point through the private branch exchange, the communication session comprising RTP media. In another embodiment, the method includes issuing, by the communications appliance, a control command to the private branch exchange during the established communication session. In still another embodiment, the method includes issuing a SIP invite command to the first end-point.

In another aspect, a system for releasing a communications appliance from a private branch exchange to establish a communication session between two end-points of a network and through the private branch exchange is shown and described. The system includes means for issuing a path replacement command to the private branch exchange, means for receiving a facility message from the private branch exchange destined for one end-point of a communications session, and means for transmitting the received facility message to another end-point of the communications session.

In still another aspect, a system for releasing a communications appliance from the media path portion of a communications session through a private branch exchange is shown and described. The system can include means for issuing a first invite command to a first end-point of a first communication session, the invite command comprising a port advertisement of a second communication session, and means for issuing a second invite command to a second end-point, the second invite command comprising a port advertisement of the first communication session.

In yet another aspect, computer readable medium having instructions thereon that when executed cause a processor to at least partial release a communications appliance from a private branch exchange to establish a communication session between two end-points of a network and through the private branch exchange is shown and described. The computer readable medium includes, in one embodiment, instructions to issue a path replacement command to the private branch exchange, instructions to receive a facility message from the private branch exchange destined for one end-point of a communications session, and instructions to transmit the received facility message to another end-point of the communications session.

In still another aspect, a computer readable medium having instructions thereon that when executed cause a processor to release a communications appliance from the media path portion of a communications session through a private branch exchange is shown and described. The computer readable medium includes, in one embodiment, instructions to issue a first invite command to a first end-point of a first communication session, the invite command comprising a port advertisement of a second communication session, and instructions to issue a second invite command to a second end-point, the second invite command comprising a port advertisement of the first communication session.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 3A is a block diagram of an embodiment of the client application for enabling a communications session;

DETAILED DESCRIPTION

Figure 1:
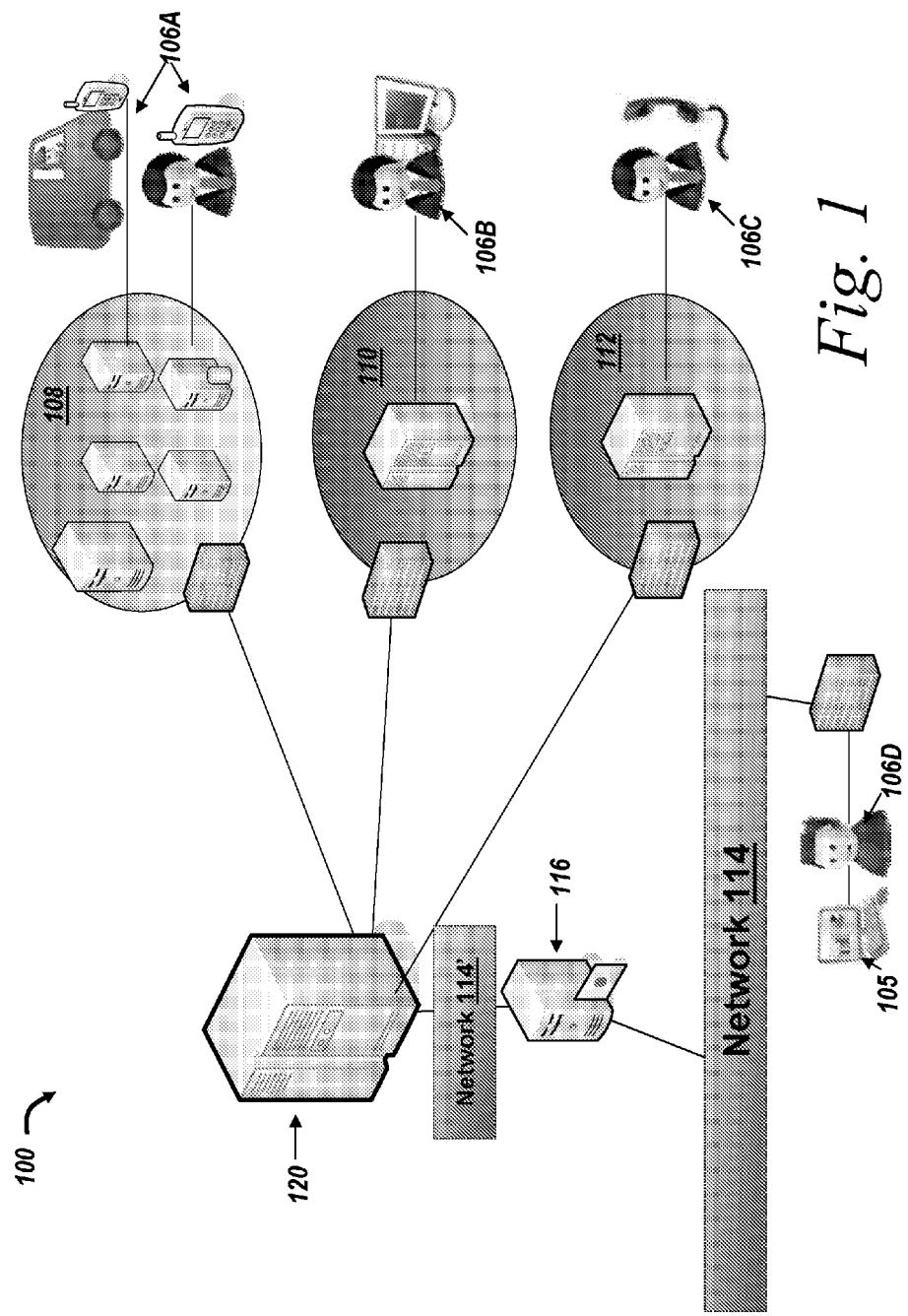
FIG. 1 depicts an embodiment of an environment for providing communications.

With reference to FIG. 1, one embodiment of an environment 100 for providing voice communication (e.g., a voice call) is shown and described. The environment 100 includes a plurality of end-users 106A, 106B, 106C, 106D (generally referred to end-user 106) that communicate using to one or more of: a mobile network 108, a packet switched network 110, and a circuit switched network 112. One of the end-users 106 is in communication with a communication gateway 116 via a network 114. The communications gateway 116 is also in communication with a private branch exchange (PBX) 120. The PBX is in communications with one or more of the mobile network 108, the packet switched network 110, and the circuit switched network 112. Also, the communications gateway 116 and the PBX 120 communicate with each other via a second network 114'. In one embodiment, the first network 114 and the second network 114' are the same network. The second network 114' can include one or more of each of a QSIG trunk, an H.323 trunk, and a SIP trunk. QSIG refers to the ISDN based signaling protocol for signaling between nodes of a Private Integrated Services Network (PISN). The QSIG protocol carries user and feature information between private branch exchanges. H.323 refers to the ITU standard that defines a framework of protocols for inter-working voice, video and data across an IP network. SIP refers to the Session Initiation Protocol, which is used for setting up communications sessions on the Internet, such as telephony, presence, events notification and instant messaging. The SIP protocol initiates call setup, routing, authentication and other feature messages to endpoints within an IP domain.

Each end-user 106 can have a computing device 105 executing software that provides at least some of the below-described functionality. The end-user 106 interacts with the computing device 105 to cause the computing device 105 to, for example, issue commands to the communications gateway 116, which in turn issues commands to the PBX 120, to establish a voice communication session.

The first network 114 and the second network 114' can be a local-area network (LAN), a metropolitan-area network (MAN), or a wide area network (WAN) such as the Internet or the World Wide Web. The computing device 105 connects to the network 114 via communications link using any one of a variety of connections including, but not limited to, standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, and direct asynchronous connections).

In other embodiments, the computing device 105 of the end-user 106 connects to the communications gateway 116 through an additional network (not shown) using another communication link that connects the network 114 to the additional network. The protocols used to communicate through the communications link can include any variety of protocols used for long haul or short transmission. For example, TCP/IP, IPX, SPX, NetBIOS, NetBEUI, SONET and SDH protocols or any type and form of transport control protocol may also be used, such as a modified transport control protocol, for example a Transaction TCP (T/TCP), TCP with selection acknowledgements (TCPSACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used. The combination of the networks 114 can be conceptually thought of as the Internet. As used herein, Internet refers to the electronic communications network that connects computer networks and organizational computer facilities around the world.

The packet switched network 110 communicates, directly or indirectly, with the PBX 120. As used herein a packet switched network refers to a data communications network where information (e.g., voice and data) is divided into packets and delivered to their destination separately and possibly via different paths. Some packet switched networks provide voice-over-IP (VoIP) functionality. The PBX 120 can provide telephone services to end-users 106 having telephone devices terminated on the packet switched network 110. As used herein, telephone devices refers telephones, fax machines, computers, IP phones, soft phones, video phones, mobile phones, wlan phones, or other devices capable of transmitting and receiving audible information.

The circuit switched network 112 also communicates, directly or indirectly, with the PBX 120. As used herein circuit switched refers to routing traffic between an originator and a destination through switching centers, from local users or from other switching centers, whereby a continuous electrical circuit is established and maintained between the calling and called stations until it is released by one of those stations. For example, the switched circuit network 112 can be the public switched telephone network (PSTN). The PBX 120 can provide telephone services to end-users 106 having telephone devices terminated on the circuit switched network 112.

The mobile network 108 communicates, directly or indirectly, with the PBX 120. As used herein, mobile network refers to facilities operated by a telephony carrier for the purposes of providing public mobile telecommunications services. The PBX 120 can provide telephone services to enterprise subscribers having telephone devices terminated on the mobile switched network 108.

As an operational summary, the PBX 120 interfaces to one or more of the mobile network 108, the packet switched network 110, and the circuit switched network 112 and to the communications gateway 116. An end-user 106 initiates a request for a communications session with another end-user 106. In response, the computing device 105 of the end-user 106 issues a signal (e.g., a command) to the communications gateway 116. In response, the communications gateway 106 establishes communications with the PBX 120 and issues a signal (e.g., a command) to the PBX to establish a communications session between the end-users 106. In such an embodiment, the communications session is established and "hosted" by the PBX 120.

Figure 2A:
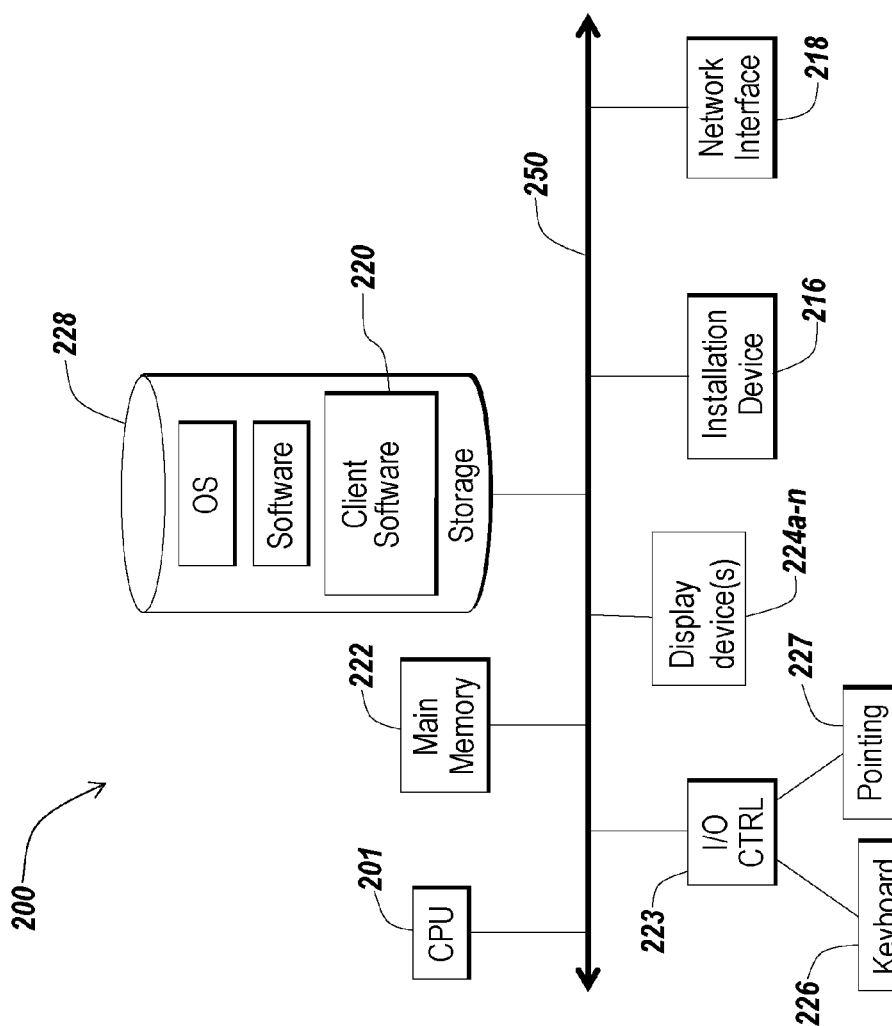
FIGS. 2A and 2B are block diagrams of embodiments of a computing device.
Figure 2B:
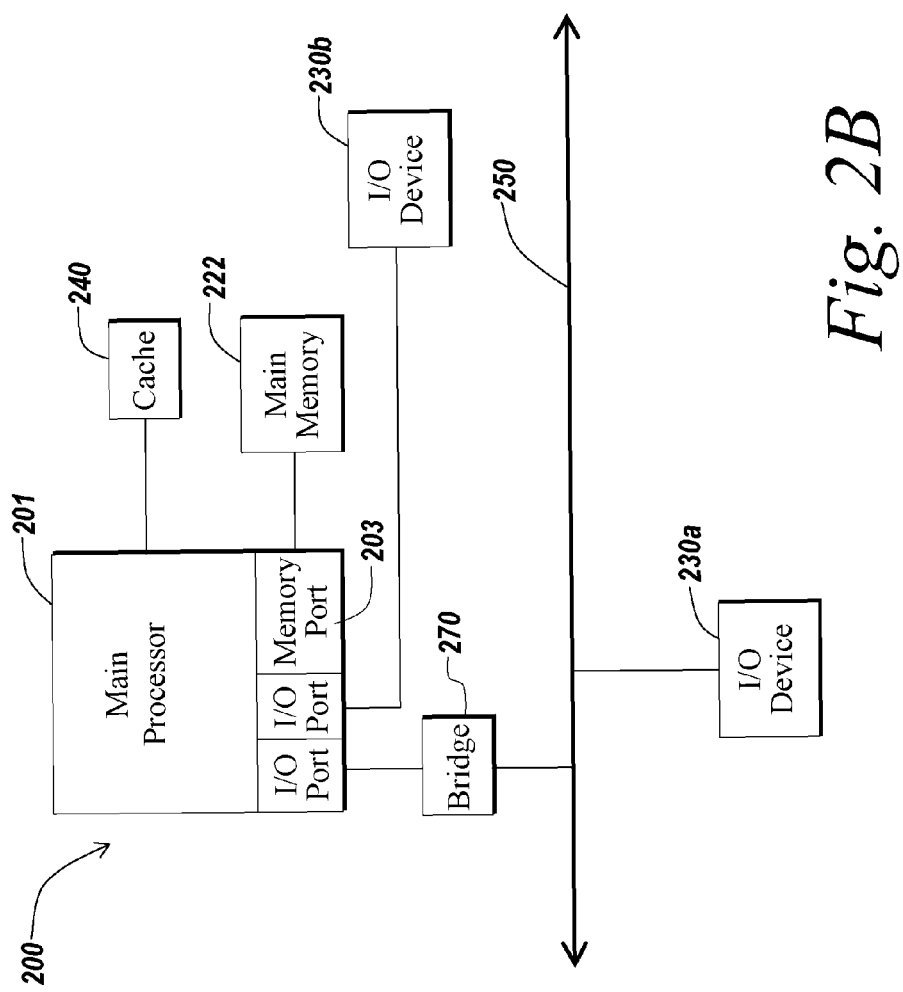

The computing devices 105, communications gateway 116, and PBX 120 may be deployed as and/or executed on any type and form of computing device, such as a computer, network device or appliance capable of communicating on any type and form of network and performing the operations described herein or known in the art. As shown in FIGS. 2A and 2B, each computing device 200 includes a central processing unit 201 and a main memory unit 222. As shown in FIG. 2A, a computing device 200 may include a visual display device 224, a keyboard 226 and/or a pointing device 227, which can control a cursor, such as a mouse. Each computing device 200 may also include additional optional elements, such as one or more input/output devices 230a-230b (generally referred to using reference numeral 230), and a cache memory 240 in communication with the central processing unit 201.

The central processing unit 201 is any logic circuitry that responds to and processes instructions fetched from the main memory unit 222. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein.

Main memory unit 222 may be one or more memory chips capable of storing data and allowing any storage location to be directly accessed by the microprocessor 201, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 may be based on any of the above described memory chips, or any other available memory chips capable of operating as described herein. In the embodiment shown in FIG. 2A, the processor 201 communicates with main memory 222 via a system bus 250 (described in more detail below). FIG. 2A depicts an embodiment of a computing device 200 in which the processor communicates directly with main memory 222 via a memory port 203. For example, in FIG. 2B the main memory 222 may be DRDRAM.

FIG. 2B depicts an embodiment in which the main processor 201 communicates directly with cache memory 240 via a secondary bus, sometimes referred to as a backside bus. In other embodiments, the main processor 201 communicates with cache memory 240 using the system bus 250. Cache memory 240 typically has a faster response time than main memory 222 and is typically provided by SRAM, BSRAM, or EDRAM. In the embodiment shown in FIG. 2A, the processor 201 communicates with various I/O devices 230 via a local system bus 250. Various busses may be used to connect the central processing unit 201 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 201 may use an Advanced Graphics Port (AGP) to communicate with the display 224. FIG. 2B depicts an embodiment of a computer 200 in which the main processor 201 communicates directly with I/O device 230 via HyperTransport, Rapid I/O, or InfiniBand. FIG. 2B also depicts an embodiment in which local busses and direct communication are mixed: the processor 201 communicates with I/O device 230 using a local interconnect bus while communicating with I/O device 230 directly.

The computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client software, or portion thereof. The computing device 200 may further comprise a storage device 228, such as one or more hard disk drives or redundant arrays of independent disks, for storing an operating system and other related software, and for storing application software programs such as any program related to a client software package 220. Optionally, any of the installation devices 216 could also be used as the storage device 228. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 200 may include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 218 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 230a-230n may be present in the computing device 200, some of which may function as pointing devices. Input devices include keyboards, mice, trackpads, trackballs, microphones, and drawing tablets. Output devices include video displays, speakers, inkjet printers, laser printers, and dye-sublimation printers. The I/O devices 230 may be controlled by an I/O controller 223 as shown in FIG. 2A. The I/O controller may control one or more I/O devices such as a keyboard 226 and a pointing device 227, e.g., a mouse or optical pen. Furthermore, an I/O device may also provide storage 228 and/or an installation medium 216 for the computing device 200. In still other embodiments, the computing device 200 may provide USB connections to receive handheld USB storage devices such as the USB Flash Drive line of devices manufactured by Twintech Industry, Inc. of Los Alamitos, Calif.

In some embodiments, the computing device 200 may comprise or be connected to multiple display devices 224a-224n, which each may be of the same or different type and/or form. As such, any of the I/O devices 130a-130n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 100 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 200, for example, via a network. These embodiments may include any type of software designed and constructed to use another computer's display device as a second display device 224a for the computing device 100. One ordinarily skilled in the art will recognize and appreciate the various ways and embodiments that a computing device 200 may be configured to have multiple display devices 224a-224n.

In further embodiments, an I/O device 230 may be a bridge 270 between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 200 of the sort depicted in FIGS. 2A and 2B typically operate under the control of operating systems, which control scheduling of tasks and access to system resources. The computing device 200 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 200 may have different processors, operating systems, and input devices consistent with the device. For example, in one embodiment the computer 100 is a Treo 180, 270, 1060, 600, 650, 680, and 700 smart phone manufactured by Palm, Inc. In this embodiment, the Treo smart phone is operated under the control of the Palm OS operating system and includes a stylus input device as well as a five-way navigator device. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the client software 220 provides functionality related to establishing a communication session, such as a telephone call, a chat session, an e-mail session, or other communications session. Further, the client software 220 can provide the end-user 105 of the client 106 with functionality that allows the end-user to "click" a telephone number or other recognized pattern within output of a software application and "call" that telephone number. Upon selection of the telephone number, the client computer 106 signals the communications gateway 116 to issue commands to the PBX 120, which in turn establishes the communication session. In addition, the end-user can edit the telephone number prior to establishing the call and also designate a phone number that the end-user wants to be called at, if the end-user 105 is away from their telephone that is associated with the PBX 120. Also, the client software 220 can perform directory traversal to locate numbers that are not located in the application output, but instead are stored in one or more heterogeneous or homogenous directory services (e.g., outlook contacts and other directory sources). Additional details of the client software 220 are described below.

Referring now to FIG. 3A, an embodiment of the client software 220 is depicted. In brief overview, the client software 220 includes a cursor detection hooking mechanism 304, a plurality of application specific process handlers 308a, 308b, 308c (referred to generally as processes handler 308), a parser module 312, a call process 316, and one or more directory handlers. Each of these modules can communicate with each other, directly or indirectly, using known programming techniques.

In further detail of FIG. 3A, the cursor detection mechanism 304 comprises any logic, function and/or operations to detect a status, movement or activity of a cursor, or pointing device, on the screen of the client computing device 105. The cursor detection mechanism 304 may comprise software, hardware, or any combination of software and hardware. In some embodiments, the cursor detection mechanism 304 comprises an application, program, library, process, service, task, or thread. In one embodiment, the cursor detection mechanism 304 may include an application programming interface (API) hook into the operating system to obtain or gain access to events and information related to a cursor, and its movement on the screen. Using a API Hooking technique, the client software 220 and/or cursor detection mechanism 304 monitors and intercepts operating system API calls related to the cursor and/or used by applications. In some embodiments, the cursor detection mechanism 304 API intercepts existing system or application's functions dynamically at runtime.

In another embodiment, the cursor detection mechanism 304 may include any type of hook, filter or source code for receiving cursor events or run-time information of the cursor's position on the screen, or any events generated by button clicks or other functions of the cursor. In other embodiments, the cursor detection mechanism 304 may comprise any type and form of pointing device driver, cursor driver, filter or any other API or set of executable instructions capable of receiving, intercepting or otherwise accessing events and information related to a cursor on the screen. In some embodiments, the cursor detection mechanism 304 detects the position of the cursor or pointing device on the screen, such as the cursor's x-coordinate and y-coordinate on the screen. In one embodiment, the cursor detection mechanism 304 detects, tracks or compares the movement of the cursor's X-coordinate and y-coordinate relative to a previous reported or received X and Y-coordinate position.

In one embodiment, the cursor detection mechanism 304 comprises logic, functionality and/or operations to detect if the cursor or pointing device is idle or has been idle for a predetermined or predefined length of time. In some embodiments, the cursor detection mechanism 304 detects that the cursor has been idle for a predetermined length of time between 100 ms and 1 sec, such as 100 ms, 200 ms, 300 ms, 400 ms, 500 ms, 600 ms, 700 ms, 800 ms or 900 ms. In one embodiment, the cursor detection mechanism 304 detects that the cursor has been idle for a predetermined length of time of approximately 500 ms, such as 490 ms, 495 ms, 500 ms, 505 ms or 510 ms. In some embodiments, the predetermined length of time to detect and consider the cursor is idle is set by the cursor detection mechanism 304. In other embodiments, the predetermined length of time is configurable by a user or an application via an API, graphical user interface or command line interface.

In some embodiments, a sensitivity of the cursor detection mechanism 304 may be set such that movements in either the X or Y coordinate position of the cursor may be received and the cursor still detected and/or considered idle. In one embodiment, the sensitivity may indicate the range of changes to either or both of the X and Y coordinates of the cursor which are allowed for the cursor to be considered idle by the cursor detection mechanism 304. For example, if the cursor has been idle for 200 ms and the user moves the cursor a couple or a few pixels/coordinates in the X and/or Y direction, and then the cursor is idle for another 300 ms, the cursor detection mechanism 205 may indicate the cursor has been idle for approximately 500 ms.

The application specific process handler 308 analyzes the contents of the application output. In some embodiments, the application output is displayed within an application window. In some embodiments, each application specific handler 308 interacts with a single type of application. For example, Internet Explorer, Microsoft Word, Edit fields (this includes notepad) and Static text fields, each can have a specific process handler 308. In other embodiments, additional process handlers are included for other applications (e.g., Adobe reader, Microsoft PowerPoint, Microsoft Excel, and the like). Also, a single application handler can interact with multiple applications that have similar characteristics. As such, there may be fewer application specific handlers the number of applications. When the pointer 328 is idle, the client software 220 initiates each of the application specific process handlers 308. In other embodiments, only specific process handlers are initiated. The client software 220 determines which window is active and thus which application is producing output in the active window. If there is an application specific process handler 308 for the application, that process handler determines whether a specific pattern of characters exists within a specific area determined relative to the location of the cursor 328, which is described in more detail below with reference to FIG. 3B.

For example, if the active window is a static window, an application specific handler retrieves text from within the application using a WM_GETTEXT message. The returned contents are analyzed for patterns. If, in one example, a telephone number is found it is displayed to the end-user. In another example, if an edit window is the active window the application specific handler uses EM_* messages that are a part of the operating system API. Text that is in the vicinity of the pointer location is returned using the WM_GETTEXT and EM_CHARFROMPOS messages.

In still another example, if the active window is an Internet Explorer window, the application specific process handler extracts the underlying HTMLDocument2 object from the window using the WM_HTML_GETOBJECT message. The handler than traverses the HTML to get the IHTMLBodyElement object, from which an IHTMLTxtRange object can be extracted containing the text under the location of the pointer. If the active window is a Microsoft Word window, the application specific process handler extracts the underlying IID_Window object from the window using the AccessibleObjectFromWindow API method. From that object, the RangeFromPoint method returns an IID_Range object containing the text at the location of the pointer.

If none of application specific process handlers 308 can resolve the application output of the active window, a default process handler is called. In one embodiment, the default process handler performs screen captures, object character recognition, and pattern matching similar to those described in U.S. patent application Ser. No. 11/539,515 filed on Oct. 6, 2006. The entire contents of which are herein incorporated by reference.

The area of the application window investigated by the process handler 308 can be a predetermined portion of the screen. In one embodiment, a rectangular area calculated to be of a predetermined size or dimension based on the font used by the system. In one embodiment, the client software 220 screen captures a rectangular portion of the screen, a scan area, based on screen resolution, screen font, and the cursor's X and Y coordinates. Although the generally described capturing a rectangular shape, any shape for the scanning area may be used in performing the techniques and operations of the client software 220 described herein. For the example, the scanning area may be any type and form of polygon or may be a circle or oval shape. Additionally, the location of the scanning area may be any offset or have any distance relationship, far or near, to the position of the cursor 328. For example, the scanning area or portion of the screen analyzed may be next to, under, or above, or any combination thereof with respect to the position of the cursor 328.

The size of the scanning area may be set such that any text of the textual element is obtained by the screen image while not making the scanning area to large as to take an undesirable or unsuitable amount of processing time. The balance between the size of the scanning area and the desired time for the client software 220 to perform the operations described herein depends on the computing resources, power and capacity of the client computing device 105, the size and font of the screen, as well as the effects of resource consumption by the system and other applications.

As depicted in FIG. 3A, the client software 220 includes or otherwise uses a parser 312. The parser 312 includes software, hardware, or any combination thereof having logic, functions or operations to perform matching of a pattern on any text. The client computing device 105 via the operating system, an application, or any process, program, service, task, thread, script or executable instructions may display on the screen, or off the screen (such as in the case of virtual or scrollable desktop screen), any type and form of textual element 320. A textual element 320 is any user interface element that may visually show text of one or more characters, such as any combination of letters, numbers or alpha-numeric or any other combination of characters visible as text on the screen. In one embodiment, the textual element 320 may be displayed as part of a graphical user interface. In another embodiment, the textual element 320 may be displayed as part of a command line or text-based interface. Although showing text, the textual element 320 may be implemented as an internal form, format or representation that is device dependent or application dependent. For example, an application may display text via an internal representation in the form of source code of a particular programming language, such as a control or widget implemented as an ActiveX Control or Java Script that displays text as part of its implementation. In some embodiments, although the pixels of the screen show textual data that is visually recognized by a human as text, the underlying program generating the display may not have the text in an electronic form that can be provided to or obtained by the client software 220 via an interface to the program.

The parser 312 may compare and/or match one or more records, such as one or more strings from a list of strings, with the recognized text of the active application window. In one embodiment, the parser 312 performs exact matching such as comparing a first string in a list of strings to the recognized text to determine if the strings are the same. In another embodiment, the parser 312 performs approximate or inexact matching of a first string to a second string, such as the recognized text. In some embodiments, approximate or inexact matching includes comparing a first string to a second string to determine if one or more differences between the first string and the second string are with a predetermined or desired threshold. If the determined differences are less than or equal to the predetermined threshold, the strings may be considered to be approximately matched.

In one embodiment, the parser 312 uses one or more decision trees or graph node techniques for performing an approximate match. In another embodiment, the parser 312 may use any type and form of fuzzy logic. In yet another embodiment, the parser 312 may use any string comparison functions or custom logic to perform matching and comparison. In still other embodiments, the parser 312 performs a lookup or query in one or more databases to determine if the text can be recognized to be of a certain type or form. Any of the embodiments of the parser 312 may also include implementation of boundaries and/or conditions to improve the performance or efficiency of the matching algorithm or string comparison functions.

In some embodiments, the parser 312 performs a string or number comparison of the recognized text to determine if the text is in a form of a telephone, facsimile or mobile phone number. For example, the parser 312 may determine if the recognized text in the form or has the format for a telephone number such as: ### ####, ###-####, (###) ###-####, ###-####-####, +##-##-###-####, and the like, where # is a number or telephone number digit. As depicted FIG. 2A, the client computing device 105, may display any type and form of contact information 324 on the screen as a textual element 320. The contact information 324 may include a person's name, street address, city/town, state, country, email address, telecommunication numbers (telephone, fax, mobile, TTY, Skype, etc), instant messaging contact info, a username for a system, a web-page or uniform resource locator (URL), and company information. As such, in other embodiments, the parser 312 performs a comparison to determine if the recognized text is in the form of contact information 324, a combination of textual elements, or a portion thereof. Also, in some embodiments, the parser 312 excludes specific types of patterns. For example, if the letters TTY precede a telephone number, the parser can ignore such a pattern because using a "click-to-call" function for such a number may not make sense.

Although the parser 312 may generally be described with regards to telephone numbers or contact information 324, the parser 312 may be configured, designed or constructed to determine if text has any type and form of pattern that may be of interest, such as a text matching (e.g., a web page address) any predefined or predetermined pattern. As such, the client software 220 can be used to isolate any patterns in the recognized text and use any of the techniques described herein based on these predetermined patterns.

The call process 316 presents the recognized patterns to the end-user 106 and provides the user the chance to edit the number to be called, look up additional numbers or contact information using the directory handlers, and/or select a new number to call. In addition, the end-user can change the number they are calling from, to change the number the calling party they will be contacted at. The user 106 can then click a call button to initiate the call.

In some embodiments, the client software 220, or any portions thereof, may be obtained, provided or downloaded, automatically or otherwise from the communications gateway 116. In one embodiment, the client software 220 is automatically installed on the client computing device 105. For example, the client software 220 may be automatically installed when a user 106 of the client computing device 105 accesses the communications gateway 220, such as via a web-page, for example, a web-page to login to a network 114. In some embodiments, the client software 220 is installed in silent-mode transparently to a user or application of the client computing device 105. In another embodiment, the client software 220 is installed such that it does not require a reboot or restart of the client computing device 105.

As an operational overview, the computing device 105 displays application output 320 comprising contact information 324 on the screen, which can be accessed via a pointing device (e.g., a cursor 328). Via the cursor detection hooking mechanism 304, the client software 220 detects that the cursor 328 has been idle for a predetermined length of time, and in response to the detection, the client software 220 launches a plurality of the application specific process handlers 308.

In one embodiment, a rectangular portion of the screen next to or near the cursor is captured The client software launches the application specific process handlers to recognize any text of the textual element that may be included in the application output 320. Using the parser 312, the client software 220 determines if the recognized text has any patterns of interest, such as a telephone number or other contact information 320.

Upon this determination, the client software 220 can act upon the recognized text by providing a user interface element in the screen selectable by the user to take an action associated with the recognized text. For example, in one embodiment, the client software 220 may recognize a telephone number in the screen captured text and provide a user interface element, such as an icon on window of menu options, for the user to select to initiate a telecommunication session. That is, in one case, in response to recognizing a telephone number in the captured screen image of the textual information, the client software 220 automatically provides an active user interface element comprising or linking to instructions that cause the initiation of a telecommunication session. In some cases, this may be referred to as a providing a "click-2-call" user interface element to the user.

Figure 3B:
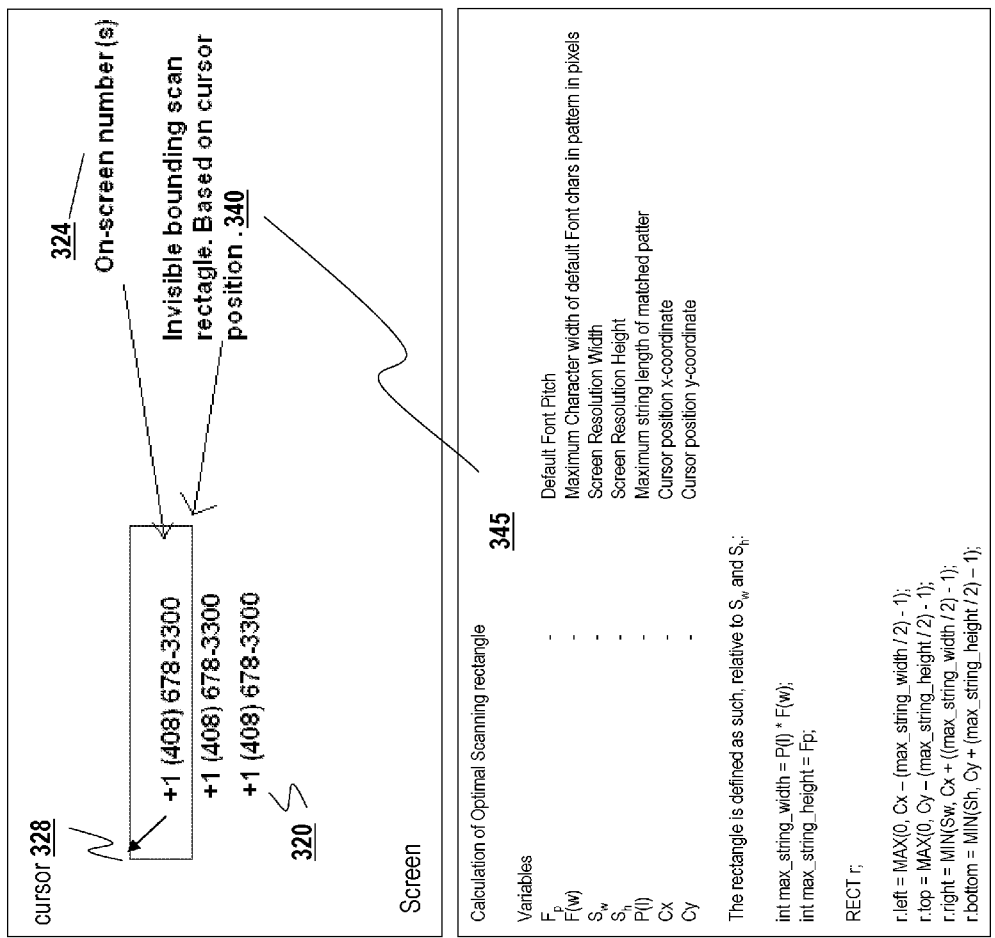
FIG. 3B is a block diagram of an embodiment of the client application determining the portion of the screen to investigate.

Referring now to FIG. 3B, an example embodiment of the client software 220 for establishing a communication session is shown and described. In brief overview, the screen of the client computing device 105 depicts a textual element 320 comprising contact information 324 in the form of telephone numbers. The cursor 328 is positioned or otherwise located near the top left corner of the textual element 320, or the first telephone number in the list of telephone numbers. For example, the cursor 328 may be currently idle at this position on the screen. The client software 220 detects the cursor 328 may be idle for the predetermined length of time and starting one or more process handlers 308 and scans a scan area 340 based on the cursor's position. As depicted by way of example, the scan area 340 may be a rectangular shape. Also, as depicted in FIG. 2B, the rectangular scan area 340 may include a telephone number portion of the textual element 320 as displayed on the screen. The calculation 345 of the scan area 340 is based on one or more of the following types of information: 1) default font, 2) screen resolution and cursor 3) position.

In further details of the embodiment depicted in FIG. 3B, the calculation 345 of the scan area 340 is based on one or more of the following variables:
Fp—Default Font Pitch
F(w)—Maximum Character width of default Font chars in pattern in pixels
Sw—Screen Resolution Width
Sh—Screen Resolution Height
P(l)—Maximum string length of matched pattern
Cx—Cursor position x-coordinate
Cy—Cursor position y-coordinate In one embodiment, the client software 220 may set the values of any of the above via API calls to the operating system or an application. For example, in the case of a Windows operating system, the client software 220 can make a call to GetSystemMetrics( ) function to determine information on the screen resolution. In another example, the client software 220 can use an API call to read the registry to obtain information on the default system fonts. In a further example, the client software 220 makes a call to the function GetCursorPos( ) to obtain the current cursor X and Y coordinates. In some embodiments, any of the above variables may be configurable. A user may specify a variable value via a graphical user interface or command line interface of the client software 220.

In one embodiment, the client software 220, or any portion thereof, such as the process handlers 308 and the parser 312, calculates a rectangle for the scanning area 240 relative to the screen resolution width and height of Sw and Sh:

$$\text{int max\_string\_width}=P(l)*F(w);$$

$$\text{int max\_string\_height}=Fp;$$

$$\text{RECT } r;$$

$$r.\text{left}=\text{MAX}(0,Cx-(\text{max\_string\_width}/2)-1);$$

$$r.\text{top}=\text{MAX}(0,Cy-(\text{max\_string\_height}/2)-1);$$

$$r.\text{right}=\text{MIN}(Sw,Cx+((\text{max\_string\_width}/2)-1);$$

$$r.\text{bottom}=\text{MIN}(Sh,Cy+(\text{max\_string\_height}/2)-1);$$

In other embodiments, the client software 220, or any portion thereof, may use any offset of either or both of the X and Y coordinates of the cursor position, variables Cx and Cy, respectively, in calculating the rectangle 340. For example, an offset may be applied to the cursor position to place the scanning area 340 to any position on the screen to the left, right, above and/or below, or any combination thereof, relative to a position of the cursor 328. Also, the client software 220 may apply any factor or weight in determining the max_string_width and max_string_height variables in the above calculation. Although the corners of the scanning area 240 are generally calculated to be symmetrical, any of the left, top, right and bottom locations of the scanning area 240 may each be calculated to be at different locations relative to the max_string_width and max_string_height variables. In one embodiment, the client software 220 may calculate the corners of the scanning area 340 to be set to a predetermined or fixed size, such as that it is not relative to the default font size.

Figure 3C:
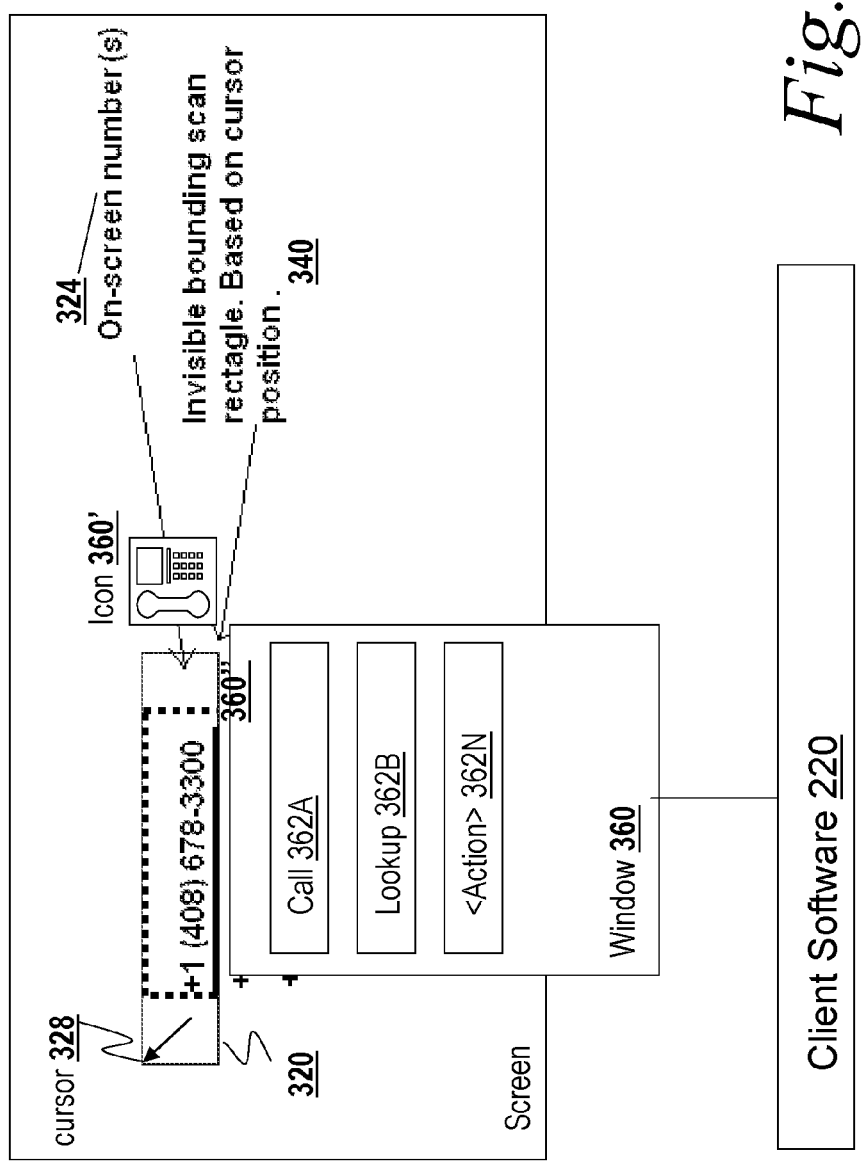
FIG. 3C is a block diagram of an embodiment of the client application displaying a user interface element for enabling a communications session.

Referring now to FIG. 3C, an embodiment of the client software 220 providing a selectable user interface element associated with the recognized text of a textual element is depicted. In brief overview, the client software 220 displays a selectable user interface element, such as a window 360, an icon 360' or hyperlink 360", alone or in various combinations, in a manner that is not intrusive to an application but overlays or superimposes a portion of the screen area of the application displaying the textual element 320 having text recognized by the client software 220. As shown by way of example, the client software 220 recognizes as a telephone number a portion of the textual element 320 near the position of the cursor 328. In response to determining the recognized text matches a pattern for a telephone number, the client software 220 displays a user interface element 360, 360' selectable by a user to take an action related to the recognized text or textual element.

In further detail, the selectable user interface element 360 may include any type and form of user interface element. In some embodiments, the client software 220 may display multiple types or forms of user interface elements 360 for a recognized text of a textual element 320 or for multiple instances of recognized text of textual elements. In one embodiment, the selectable user interface element includes an icon 360' having any type of graphical design or appearance. In some embodiments, the icon 360' has a graphical design related to the recognized text or such that a user recognizes the icon as related to the text or taking an associated action related to the text. For example and as shown in FIG. 3C, a graphical representation of a phone may be used to prompt the user to select the icon 360' for initiating a telephone call. When selected, the client software 220 initiates a telecommunication session to the telephone number recognized in the text of the textual element 320 (e.g., 1 (408) 678-3300).

In another embodiment, the selectable user interface element 360 includes a window 360 providing a menu of one or more actions or options to take with regards to the recognized text. For example, as shown in FIG. 3C, the client software 220 may display a window 360 allowing the user to select one of multiple menu items 362A-362N. By way of example, a menu item 362A may allow the user to initiate a telecommunication session to the telephone number recognized in the text of the textual element 320 (e.g., 1 (408) 678-3300). The menu time 362B may allow the user to lookup other information related to the recognized text, such as contact information (e.g., name, address, email, etc.) of a person or a company having the telephone number (e.g., 1 (408) 678-3300).

The window 360' may be populated with a menu item 362N to take any desired, suitable or predetermined action related to the recognized text of the textual element. For example, instead of calling the telephone number, the menu item 362N may allow the user to email the person associated with the telephone number. In another example, the menu item 362N may allow the user to store the recognized text into another application, such as creating a contact record in a contact management system, such as Microsoft Outlook manufactured by the Microsoft Corporation, or a customer relationship management system such salesforce.com provided by Salesforce.com, Inc. of San Francisco, Calif. In another example, the menu item 362N may allow the user to verify the recognized text via a database. In a further example, the menu item 362N may allow the user to give feedback or indication to the client agent if the recognized text is an invalid format, incorrect or otherwise does not correspond to the associated text. The menu item 362N can also allow the end-user 106 to change their current contact number. That is the number that the PBX 120 dials to reach the end-user 106 to establish one portion of the call.

For example, the client software 220 can traverse one or more heterogeneous directories of the client computing device 105. In some embodiments, specific directory handlers 317 are included with the client software 220. In one embodiment, each directory specific handlers searches a specific directory located on the client. For example, an Outlook directory handler traverses the Outlook contacts of the client 105 while a Skype directory handler traverses the Skype directory of the client. Also, and LDAP directory handler can search the LDAP directory resident on the communications gateway 116 or a local version thereof stored at the client 105. In such embodiments, there is not a need to "consolidate" the directories of the client 105. That is, there is no need to import the information from the multiple directories into a signal directory. The results from the plurality of the directory specific handlers are consolidated and displayed to the end-user of the client computing device 105.

Figure 3D:
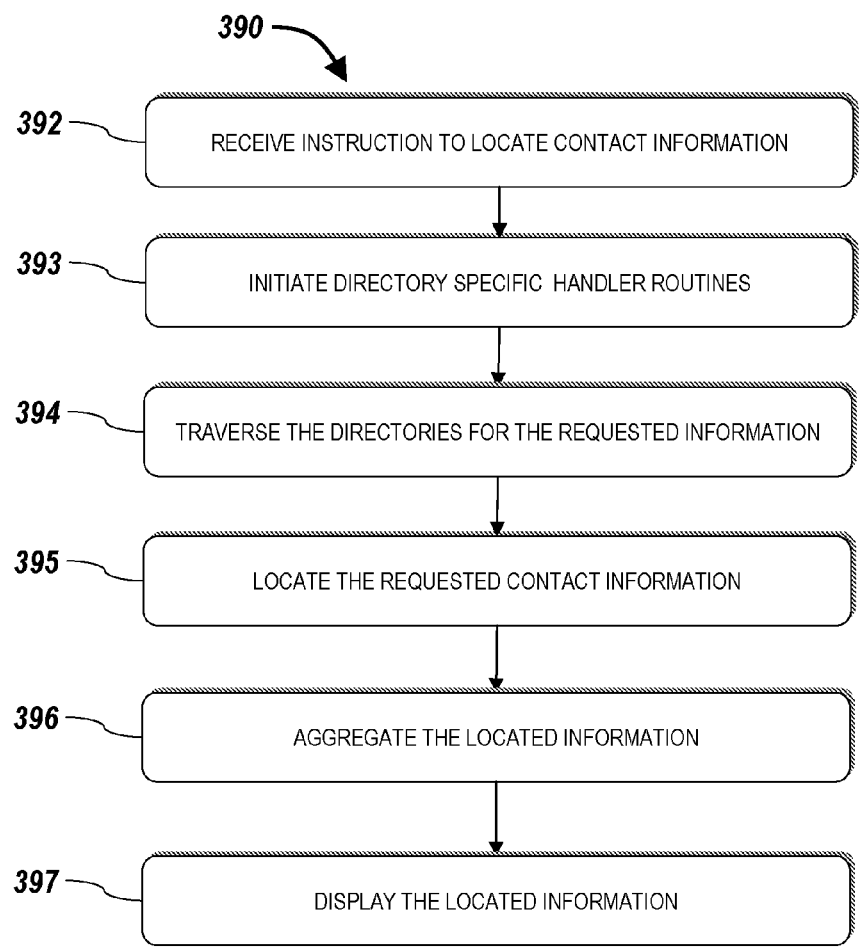
FIG. 3D is a flow chart of an embodiment of a method of locating information stored within a directory.

With reference to FIG. 3D, a method 390 of locating information stored within one or more directories of a computing device is shown and described. The method 390 includes receiving (step 392) an instruction to locate a portion of contact information stored in the one or more directories. In response to receiving the command, the client software 220 initiates (step 393) a plurality of directory handler routines. The various directories sources may store contact information in different formats, thus different handlers are associated with different types of directories. However, if multiple directories stored contact information in a substantially similar manner than a single directory handler can operate on those directories. The directory handler routines traverse (step 394) the directories of the computing and locates (step 395) the requested contact information. If multiple directories have the requested contact information, the client software 220 aggregates (step 396) the located information. In some embodiments, duplicate contact information is removed. Once aggregated, the located information is displayed (step 397) to the end-user of the computing device.

Referring back to FIG. 3C, in still another embodiment the user interface element may include a graphical element to simulate, represent, or appear as a hyperlink 360". For example, as depicted in FIG. 3C, a graphical element may be in the form of a line appearing under the recognized text, such as to make the recognized text appear as a hyperlink. The user element 360' may include a hot spot or transparent selectable background superimposed or overlaying the recognized text (e.g., telephone number 1 (408) 678-3300) as depicted by the dotted-lines around the recognized text. In this manner, a user may select either the underlined portion or the background portion of the hyperlink graphics to select the user interface element 360".

In one exemplary embodiment, the user interface element 360 is a telephone bar that provides the number to be called in editable fields so that the user can modify the numbers if needed. The user interface element 360 can also include a button to initiate the call. Also, the end-use 106 can access directory services a call log, and other sources to retrieve additional telephone numbers. The call log, in some embodiments, can include a listing of the most recent numbers dialed and the time the call was placed and other information. Initially, the phone bar has a very low initial alpha state, meaning that it's mostly translucent. As the user moves the cursor 328, the phone bar window's alpha state will rise and fall. The closer to the phone bar the cursor 328 comes, the more visible the window becomes. When the alpha start drops to zero, the phone bar disappears until needed again. In one embodiment, the rate of change of the alpha state has two modes, when the phone bar first appears, it fades in and out very quickly, once the mouse have gone over the bar, the rate becomes slower. This allows the user 106 to easily ignore the bar if they're not interested in making a call but once the user puts the mouse over the phone bar, prevents a stray twitch from making the bar go away.

Any of the types and forms of user interface element 360, 360' or 360" may be active or selectable to take a desired or predetermined action associated therewith. In one embodiment, the user interface element 360 may comprise any type of logic, function or operation to take an action. In some embodiments, the user interface element 360 includes a Uniform Resource Locator. In other embodiments, the user interface element 360 includes an URL address to a web-page, directory, or file available on a network 114. In some embodiments, the user interface element 360 transmits a message, command or instruction. For example, the user interface element 360 may transmit or cause the client software 320 to transmit a message to the communications gateway 116. In another embodiment, the user interface element 360 includes script, code or other executable instructions to make an API or function call, execute a program, script or application, or otherwise cause the computing device 105, an application or any other system or device to take a desired action.

For example, in one embodiment, the user interface element 260 calls a Telephony Application Programming Interface (TAPI) function to communicate with another end-user 106. In another embodiment, a call handler or other computing service is used. The user interface element 360 is configured, designed or constructed to initiate or establish a telecommunication session via the communications gateway 116 and the PBX 120 to the telephone number identified in the recognized text of the textual element 320. In another embodiment, the user interface element 360 is configured, designed or constructed to transmit a message to the communications gateway 116, or have the client software 220 transmit a message to the appliance 200, to initiate or establish a telecommunication session to the telephone number identified in the recognized text of the textual element 320. In yet another embodiment, in response to a message, call or transaction of the user interface element, the communications gateway 116 and client software 220 work in conjunction to initiate or establish a telecommunication session.

As discussed herein, a telecommunication session includes any type and form of telecommunication using any type and form of protocol via any type and form of medium, wire-based, wireless or otherwise. By way of example a telecommunication may session includes but is not limited to a telephone, mobile, VoIP, soft phone, email, facsimile, pager, instant messaging/messenger, video, chat, short message service (SMS), web-page or blog communication, or any other form of electronic communication.

Figure 3E:
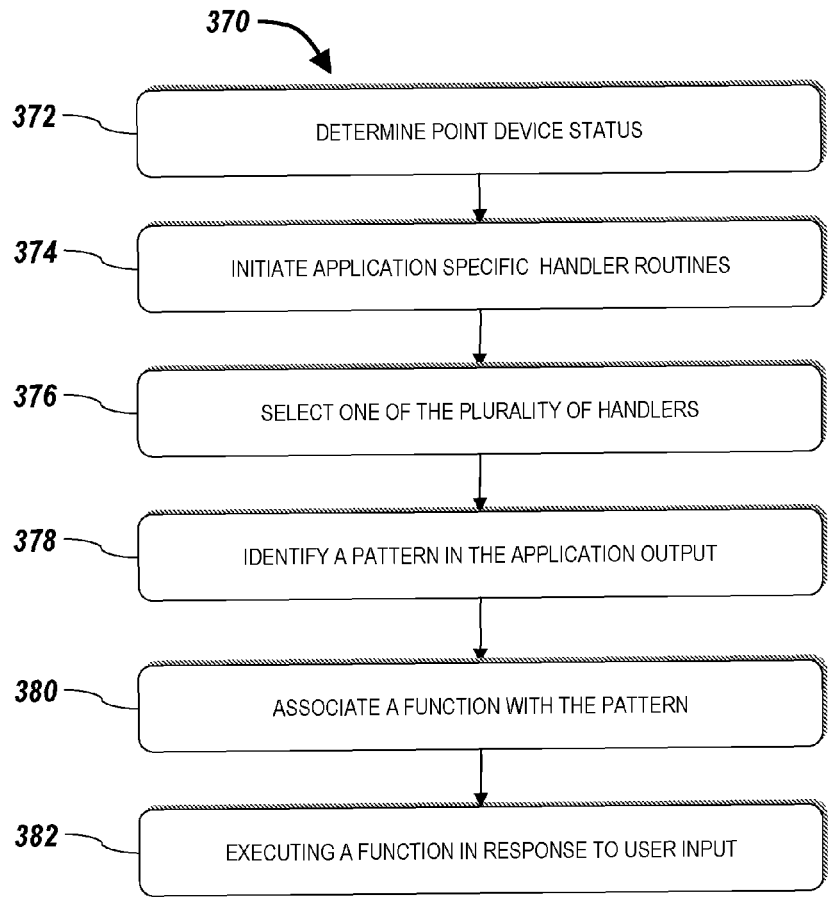
FIG. 3E is a flow chart of an embodiment of a method for recognizing a character pattern within output of an application.

With reference to FIG. 3E, a method 370 of recognizing a character pattern within output of an application is shown and described. The method 370 includes, in one embodiment, determining (step 372) the status of the pointing device, initiating (step 374) a plurality of application specific window handler routines, and selecting (step 376) one of the plurality of routines to operate on the application output. The method 370 further includes identifying (step 378) a pattern within the application output, associating (step 380) a function with the identified pattern, and executing (step 382) the function in response to a predetermined input received via an input device of the client computing device 105.

Figure 4:
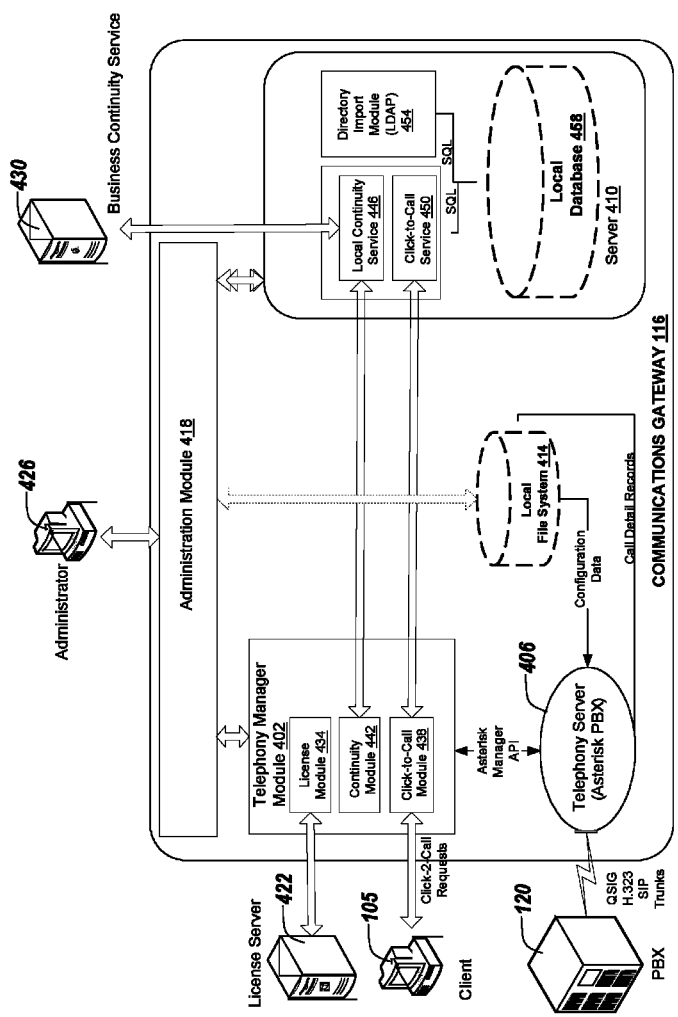
FIG. 4 is a block diagram of an embodiment of a communications gateway.

With reference to FIG. 4, an embodiment of the communications gateway 116 is shown and described. The gateway can include a telephony manager module 402, a telephony server 406, a server 410, a local file system 414, and an administration module 418. The telephony manager module 402 communicates with the server 410, the telephony server 406, the file system 414, the client 106, and in some embodiments, a licensing server 422. The telephony server 406 communicates with the PBX 120 via the one or more QSIG, DMS 100, H.323, and SIP trunks that can be part of the second network 114' and the local file system 414. The administration module 418 communicates with the telephony manager module 402, the local file system 414, the server 410, and a administrator computing device 426. In one embodiment, the server 410 communicates with a business continuity service via one or more of the networks 114.

In one embodiment, the telephony manager module 402 includes a license module 434, a click-to-call module 338 and an optional continuity module 442. Each of these modules can be a stand alone program executing on the communications gateway 116. Also, the functionality of these modules can be provided in a single application. As an operational overview, the telephony manager module 402 serves as a middleware between the telephony server 306, the client software 220, and the optional business continuity services 430. The telephony manager module 418 receives business continuity lookup requests from the telephony server 406, click-to-call requests from the clients 106 and proxies them to the business continuity service via a local service, which is described in more detail below, or click-to-call services, which are also described in more detail below. The telephony manger 402 also controls its behavior by placing outbound calls to the PBX via a telephony server API 442. The telephony manager 402 is also responsible for starting/stopping/restarting the telephony server 406 upon receipt of one or more commands from the administration module 418.

The license module 434 communicates with the license server 422. The license module performs checks with the license server 422 to control individual features of the communications gateway 116. In some embodiments, the license module 434 performs end-user 105 authentication based on supplied domain user credentials. In more detail, the license module 434 issues handles to the requests issued from authenticated end-users 105.

Telephony server 406 enables the communications gateway 116 to integrate with various customer PBXs via one or more QSIG, H.323 or SIP trunks. In one embodiment, the telephony server 306 is based on the ASTERISK PBX software distributed by Digium, Inc. Asterisk is a complete IP PBX in software. It runs on a wide variety of operating systems including Linux, Mac OS X, OpenBSD, FreeBSD and Sun Solaris and provides all of the features of a PBX including many advanced features that are often associated with high end (and high cost) proprietary PBXs. Asterisk® supports Voice over IP in many protocols, and can interoperate with almost all standards-based telephony equipment using relatively inexpensive hardware. In operation, the telephony manager module 402 receives inbound call requests from the computing device 105 of the end-user 106 and initiates the placement of one or more outbound calls by signaling the PBX 120.

In one embodiment, the server 410 includes an optional local business continuity service 446, a local click-to-call service 450, a directory import module 454, and local database 458. In one embodiment, the local business continuity service 446 provides periodic synchronization of redirected telephone numbers and authentication of communication servers requesting redirected number lookups.

In one embodiment, the local click-to-call service 450 provides authentication of the click-to-call requests received by the communications gateway 116 and lookups an end-user's 105 PBX extension or a current contact number of the end-user 105 using directory information. In one embodiment, a token or login credential that is supplied with the click-to-call request is compared against a list of stored credentials to authenticate the end-user 106. In one embodiment, a license handle is supplied with the request and the license module 434 performs the authentication.

In one embodiment, the directory import module 454 periodic acquires directory information from one or more lightweight directory access protocol (LDAP) sources into the local database 458. This acquired information is used by the local click-to-call service 450 to resolve an end-user's 106 login identity to a telephone number or a PBX extension. Additionally, the directory import module can synchronize its contents against the sources from which it imports the data initially. This synchronization can occur on periodic basis or an aperiodic basis.

In one embodiment, the local database 458 is an SQL database and communicates with the various modules of the server 410 using SQL commands. Although described as a relational database, other types of databases can be used. For example, a flat-file database can be implemented.

The file system 414 organizes directories and files, generally in terms of how it is implemented in the disk operating system. Examples of file system types include, but are not limited to, FAT16, FAT32, EAFS, NTFS, HPFS, S51K, Ext2, AFS. In some embodiments, the file system 414 stores configuration files, logs, profiles, directories and databases. Also, the file system 414 can store additional data.

Administration module 418 provides the functionality to provision certain aspects of the communications gateway 116. An administrator computing device 426 communicates with the administration module 418 and allows an end-user of the administrator computing device 426 to configure the communications gateway 116 for service. For example, the links between the PBX 120 and the communications gateway 116 can be provisioned using the administrator module 418. Also, the administration module 418 can configure features and aspects of the PBX 120 interfaces and other services. Further, the administration module 418 can interact with the license server and configure user profiles and network settings. In one embodiment, the interaction between the administrator computing device 426 and the communications gateway is web-based.

The license server 422 controls individual features of the communications gateway 116 and its maximum capacity. For example, the number of concurrent end-users 106 and be increased and decreased as needed. In one embodiment, the license server 422 participates in the authentication of end-users. In one embodiment, the license server is external to the communication gateway 116. In another embodiment, the license server 422 is incorporated into the communications gateway 116.

The business continuity service 430 can also communicate directly or indirectly with the communications gateway 116. The business continuity service 430 provides functionality related to maintenance of computing and communications functionality in the event of a service disruption that results from a natural disaster or other event.

As an operation summary, the communications gateway 116 receives commands and signals from the clients 106 and responds to those commands by issuing additional commands and signals to the PBX 120 and in some instances the business continuity service 430. For example, click-to-call request from the clients are received by telephony manager 402, validated by the server 410, and forwarded to the telephony server 406. In response, the commands and signals to establishes a communication session are forwarded from the telephony server 406 to the PBX 120 via one or more of the various trunks.

Figure 5:
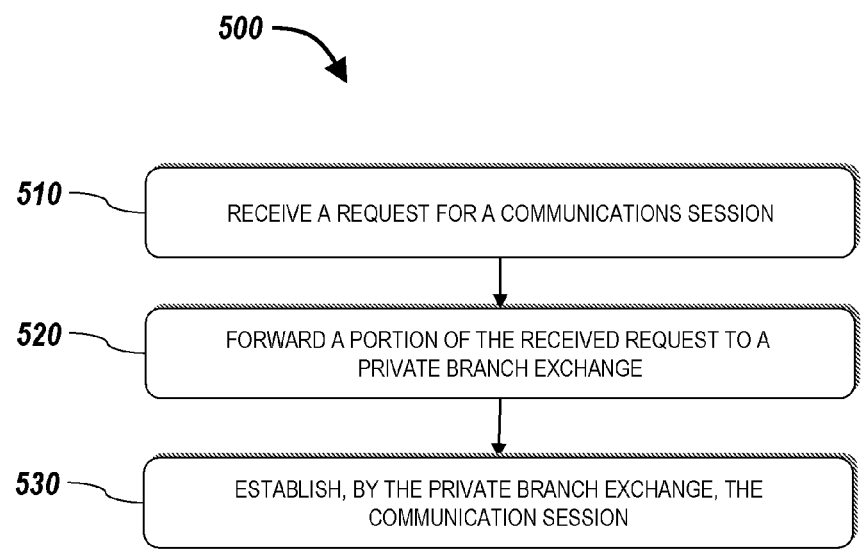
FIG. 5 is a flow chart of a method of establishing a communications session.

With reference to FIG. 5, a method 500 of establishing a communications session is shown and described. The method 500 includes receiving (step 510) by the communications gateway 116 from one of the client computing devices, forwarding (step 520) at least a portion of the received request to the PBX 120, and establishing (step 530) the communications session.

In one embodiment, the communications gateway 116 receives (step 510) the request from one or more of the client computers across a network using any of the previously described protocols and their equivalents. In some embodiments, the client computers are executing at least of portion of the client software 220. For example, the client computer can execute a program that locates, using the previously described systems and methods, address information (e.g., a telephone number or e-mail address) for use in establishing the communications session.

The communications gateway 116 forwards (step 520) at least a portion of the received request to the PBX 120. The portion can include all or a part of the located address information. For example, in the case of a telephone number the area code may or may not be forwarded to the PBX 120. In other embodiments, other portions are forwarded to the PBX 120.

In response to receiving the address information, the PBX 120 establishes (step 530) a communications session between the end-point requesting the session and the end-point included in the address information. Said another way, a communications session is established between the requesting end-point and another end-point. In one embodiment, each leg of the communications session is established independently. For example, the leg between the PBX 120 and the requesting end-point is established first and then the second leg is established. In another embodiment, the second leg is established first. In other embodiments, the legs of the communications session are established nearly simultaneously.

Figure 6:
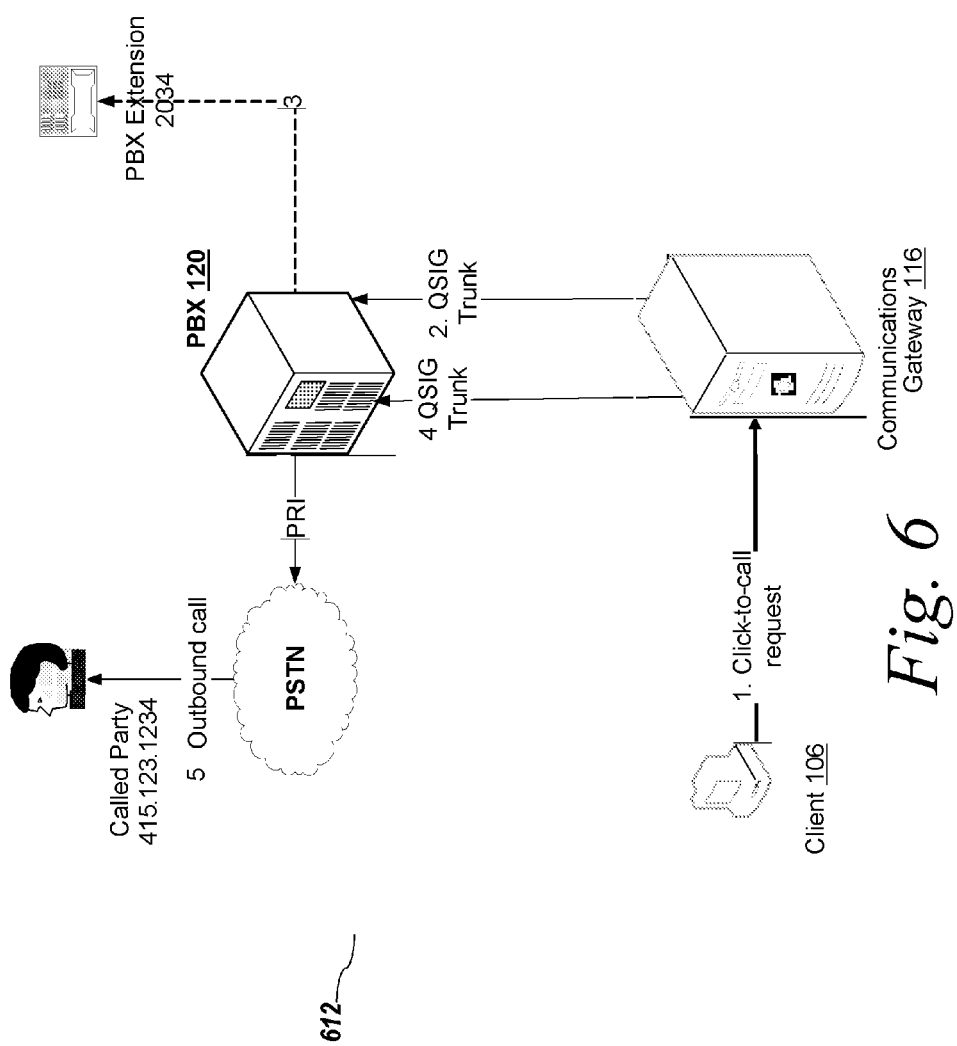
FIG. 6 is a block diagram of an embodiment of a method of establishing a communications session using the client software and the communications gateway.

In further detail and with reference to FIG. 6, in response to an end-user 105 selecting a telephone number on their client computing device 106, a click-to-call (C2C) request is sent by the client software 220 to the communications gateway 116. In one embodiment, the request contains the end-user's unique identity (e.g., a login name, a token, or any other identifier) and the destination phone number. In response, the communication gateway 116 converts the end-user's 105 identity to the user's PBX extension by performing lookup against a local LDAP directory. In another embodiment, the end-user specifies as part of the request, or shortly thereafter, a current location at which to the call the requesting end-user 105. For example, the end-user can choose to have the call connected to their cellular phone, home phone, a softphone, or any other telecommunications device.

After the destination telephone number and the end-user's 105 destination number are determined, the communications gateway 116 signals the PBX 120, which in turn, places an outbound call to the user's present destination (e.g., a PBX extension). Upon the user 105 answering the destination, the PBX 120, in some embodiments, requires the end-user to take an action to complete the call to the other destination number. For example, the end-user is prompted to depress the #1 on their keypad. Alternatively, the end-user may be required to speak the number "one" or some other phrase. Requiring the end-user to make an affirmative action before completing the call to the other telephone number prevents two voicemail systems from connecting to each other. For example, if the end-user inputs an incorrect current location number the PBX, when establishing the first call may connect to a voicemail system. If the other telephone number is not answered and goes to voicemail, the two voicemail systems will both be waiting for input from each other thus tying up the PBX for some period of time.

Once the end-user provides the affirmative indication, the communication gateway signals the PBX, which in turn, places a call to the external (i.e., second) number and allows the user to hear call progress. If called party picks up the phone or the call is routed to the called party's voice mail, click-to-call operation is considered successful. Once the call is established, it is desirable, in some embodiments, for the communications gateway 116 to remove itself from the call path.

Figure 7:
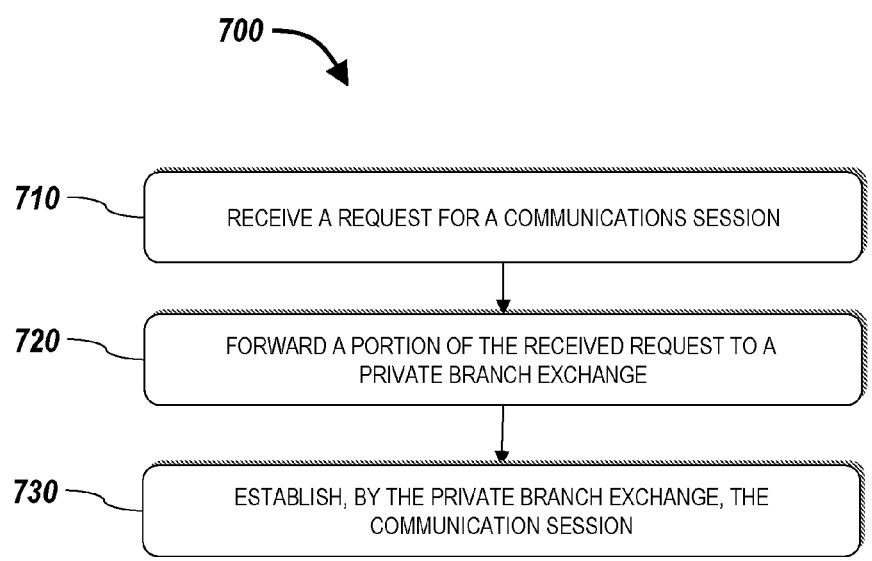
FIG. 7 is a flow chart of an embodiment of a method of establishing a communication session among end-points having a voicemail service associated therewith.

With reference to FIG. 7, a method 700 of establishing an audio communications session between two end-points, each having a voicemail service associated therewith is shown and described. The method 700 includes issuing (step 710) an invitation from a first one of the end-points (e.g., a client computing device). The method 700 also includes receiving (step 720) an indication that the first end-point is available for a communication session and that the invitation did not terminate with the voicemail service associated with the first end-point. In response to receiving the indication, the PBX 120 issues (step 730) an invitation to join the audio communications session to a second end-point.

In one embodiment, the PBX 120 issues a request for a communications using any of the above-described methods and systems and their equivalent. The invitation can be a SIP invitation or some other know communications protocol (e.g., H.323).

In one embodiment, receiving (step 720) an indication includes receiving a "touch-tone" response from the end-users end-point device. For example, the end-user can depress the number one on the keypad of their phone to indicate that the end-user has answered the invitation. Including such an affirmative action reduces the possibly of the voicemail systems of the end-users becoming connected with one another. Also, such an action aids in ensuring that the end-user did not provide the PBX with an incorrect present location for the end-user.

Once the end-user provides the appropriate affirmative action, the PBX 120 issues (step 730) an invitation to a second end-point to thereby establish the communications session between the end-points. Again, the invitation can be any issued using any of the before-mentioned systems and methods and their equivalents.

After the PBX 120 establishes the communications session, in one embodiment the communications gateway 116 releases itself from the media path by using either QSIG call path replacement or SIP re-INVITEs to perform direct media bridging. At this point, the communications gateway 116 resources are released from the media path. In other embodiments, other commands are used to release the communications gateway 116 from the media path. As used herein, a SIP re-INVITE refers to an INVITE command issued after an initial INVITE command during a communications session.

Figure 8:
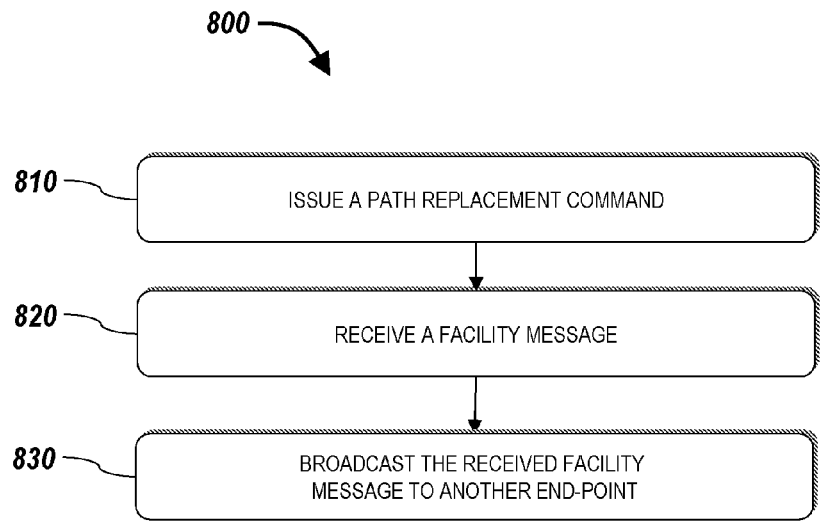
FIG. 8 is a flow chart of an embodiment of a method of at least partially releasing a communications application from a private branch exchange.

With reference to FIG. 8, a method 800 of releasing a communications appliance (e.g. the communications gateway 116) from the PBX 120 is shown and described. The method 800 includes issuing (step 810), by the communications appliance, a path replacement command to the PBX 120. In response, the communications appliance receives (step 820) a facility message from the PBX 120 that was destined one end-point of the communications session. In response, the communications appliance transmits the received facility message to another end-point of the communications session.

In one embodiment if QSIG trunk is used, the communication gateway 116 issues a QSIG Path Replacement additional network feature. This causes PBX 120 to send a FACILITY message on one of the call legs which communication gateway 116 rebroadcasts to the other call leg. Finally, the PBX 120 sends an ISDN RELEASE to both call legs and bridges the talk path between caller and the PBX 120 user locally. At this point communication gateway is out of the signaling path and can accept new calls on the released DS0 channels.

Figure 9:
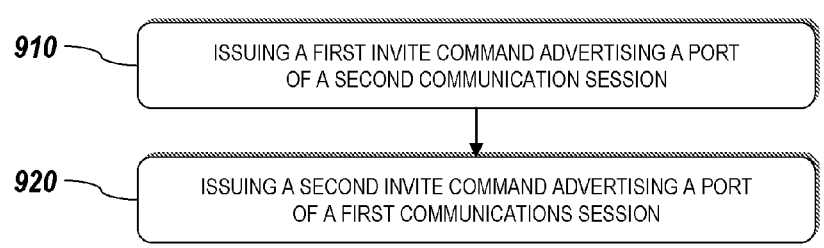
FIG. 9 is a flow chart of an embodiment of a method of at least partially releasing a communications application from a private branch exchange.

With reference to FIG. 9, an embodiment of a method 900, of releasing a communications appliance from the media path portion of a communications session through a private branch exchange is shown and described. The method 900 can include issuing (step 910), by the communications appliance, an invite command to a first end-point of a first communications session. The first invite command includes a port advertisement of a second communications session support by alone in combination with the PBX 120 and the communications gateway 116. The method 900 also includes issuing (step 920), by the communications appliance, a second invite command to a second end-point of the communications session. The second invite command includes a port advertisement of the first communications session.

In another embodiment, if SIP trunking is used between the communication gateway 116 and the PBX 120 the gateway 116 issues a SIP INVITE to the outbound call leg advertising media port of the incoming call. After the outgoing PBX 120 call leg answers the call with SIP 200 OK response, the communication gateway 116 sends a SIP re-INVITE to the incoming call leg, advertising media port of the outbound call leg. This results in a connection where the communications gateway 116 controls both signaling call legs for the duration of the call, but the RTP media is sent directly between the two IP PBX ports at all times, keeping the communication gateway 116 out of the media path.

What is claimed is:

1. A method of a releasing a communications appliance from a private branch exchange to establish a communication session between two end-points of a network and through the private branch exchange, the method comprising:
    issuing, by a communications appliance, a path replacement command to the private branch exchange to release the communications appliance from a communication session with the private branch exchange, the communications appliance intermediary to the private branch exchange and a plurality of end points on a computer network;
    receiving, by the communications appliance, a facility message from the private branch exchange destined for a first end-point of the communications session, the first end-point of the plurality of end points requesting the communication session via the communications appliance with a second end-point of the plurality of end points;
    transmitting, by the communications appliance, the received facility message to the second end-point of the communications session;
    transmitting, by the private branch exchange, an ISDN release command to the first end-point of the communication session and the second end-point of the communication session to bridge the first end-point and the second-end point via the path; and
    wherein the communications appliance is released from the path, maintains control of the path for the duration of the communication session between the first end-point and second end-point after being released and the communications appliance accepts a new communication session between a third end-point and a fourth end-point using resources released from the path.

2. The method of claim 1 further comprising issuing, by the private branch exchange, a release command to each of the end-points of the communication session.

3. The method of claim 2 wherein issuing a release command comprises issuing an ISDN release command.

4. The method of claim 1 wherein issuing a path replacement command comprises issuing a path replacement command from the communications appliance.

5. The method of claim 1 wherein the communications appliance maintains control of the path for the duration of the communication session by controlling both signaling call legs for the duration of the call between the first end-point and the second-end point, and wherein media is sent directly between the first end-point and the second end-point through ports on the private branch exchange.

6. A method of releasing a communications appliance from the media path portion of a communications session through a private branch exchange, the method comprising:
    issuing, by a communications appliance, a first invite command to a first end-point of a first communication session to release the communications appliance from a second communication session through the private branch exchange, the invite command comprising a port advertisement of the second communication session between the communications appliance and a second end-point, the communications appliance intermediary to a private branch exchange and a plurality of end points on a computer network;
    issuing, by the communications appliance, a second invite command to the second endpoint to release the communications appliance from the first communication session through the private branch exchange, the second invite command comprising a port advertisement of the first communication session between the communications appliance and the first end-point;
    transmitting, by the private branch exchange, an ISDN release command to the first end-point of the communication session and the second end-point of the communication session to bridge the first end-point and the second-end point via the path; and
    wherein the communications appliance is released from the path, maintains control of the path for the duration of the communication session between the first end-point and second end-point after being released and the communications appliance accepts a new communication session between a third end-point and a fourth end-point using resources released from the path.

7. The method of claim 6 further comprising establishing a communications session between the first end-point and the second end-point through the private branch exchange, the communication session comprising RTP media.

8. The method of claim 7 further comprising issuing, by the communications appliance, a control command to the private branch exchange during the established communication session.

9. The method of claim 6 wherein the issuing an invite command comprises issuing a SIP invite command to the first end-point.

10. A system releasing a communications appliance from a private branch exchange to establish a communication session between two end-points of a network and through the private branch exchange, the system comprising: means for issuing by a processor, of a communications appliance executing on a device, a path replacement command to the private branch exchange to release the communications appliance from a communication session with the private branch exchange, the communications appliance intermediary to the private branch exchange and a plurality of end points on a computer network; means for receiving by a processor, of the communications appliance, a facility message from the private branch exchange destined for a first end-point of the communications session the first end-point of the plurality of end points requesting the communication session via the communications appliance with a second end-point of the plurality of end points; means for transmitting by a processor, of the communications appliance, the received facility message to the second end-point of the communications session; means for issuing by a processor, of the private branch exchange, an ISDN release command to the first end-point of the communication session and the second end-point of the communication session to bridge the first end-point and the second-end point via the path; and wherein the communications appliance is released from the path, maintains control of the path for the duration of the communication session between the first end-point and second end-point after being released and the communications appliance accepts a new communication session between a third end-point and a fourth end-point using resources released from the path.

11. The system of claim 10 further comprising means for issuing, by the private branch exchange, a release command to each of the end-points of the communication session.

12. The system of claim 11 wherein the means for issuing a release command comprises means for issuing an ISDN release command.

13. The system of claim 10 wherein the means for issuing a path replacement command comprises means for issuing a path replacement command from the communications appliance.

14. The system of claim 10 wherein the means for receiving a facility message comprises means for receiving a facility message by the communications appliance.

15. A system for releasing a communications appliance from the media path portion of a communications session through a private branch exchange, the system comprising: means for issuing by a processor, of a communications appliance comprising a device having a processor, a first invite command to a first end point of a first communication session to release the communications appliance from a second communication session through the private branch exchange, the invite command comprising a port advertisement of the second communication session between the communications appliance and a second end-point, the communications appliance intermediary to a private branch exchange and a plurality of end points on a computer network; means for issuing by a processor, of the communications appliance, a second invite command to a second end-point to release the communications appliance from the first communication session through the private branch exchange, the second invite command comprising a port advertisement of the first communication session between the communications appliance and the first end-point; means for issuing by a processor, of the private branch exchange, an ISDN release command to the first end-point of the communication session and the second end-point of the communication session to bridge the first end-point and the second-end point via the path; and wherein the communications appliance is released from the path, maintains control of the path for the duration of the communication session between the first end-point and second end-point after being released and the communications appliance accepts a new communication session between a third end-point and a fourth end-point using resources released from the path.

16. The system of claim 15 further comprising means for establishing a communications session between the first end-point and the second end-point through the private branch exchange, the communication session comprising RTP media.

17. The system of claim 16 further comprising means for issuing, by the communications appliance, a control command to the private branch exchange during the established communication session.

18. The system of claim 15 wherein the means for issuing an invite command comprises means for issuing a SIP invite command to the first end-point.

19. A non-transitory computer readable medium having instructions thereon that when executed cause a processor to at least partial release a communications appliance from a private branch exchange to establish a communication session between two end-points of a network and through the private branch exchange, the computer readable medium comprising:
  instructions for a communications appliance to issue a path replacement command to the private branch exchange to release the communications appliance from a communication session with the private branch exchange;
  instructions for the communications appliance to receive a facility message from the private branch exchange destined for a first end-point of the communications session, the first end-point of the plurality of end points requesting the communication session via the communications appliance with a second end-point of the plurality of end points;
  instructions for the communications appliance to transmit the received facility message to the second end-point of the communications session;
  instructions for the private branch exchange to issue an ISDN release command to the first end-point of the communication session and the second end-point of the communication session to bridge the first end-point and the second-end point via the path; and
  wherein the communications appliance is released from the path, maintains control of the path for the duration of the communication session between the first end-point and second end-point after being released and the communications appliance accepts a new communication session between a third end-point and a fourth end-point using resources released from the path.

20. The computer readable medium of claim 19 further comprising instructions to issue, by the private branch exchange, a release command to each of the end-points of the communication session.

21. The computer readable medium of claim 20 wherein issuing a release command comprises issuing an ISDN release command.

22. The computer readable medium of claim 19 wherein the instructions to issue a path replacement command comprise instructions to issue a path replacement command from the communications appliance.

23. The computer readable medium of claim 19 wherein the instructions to receive a facility message comprise instructions to receive a facility message by the communications appliance.

24. A non-transitory computer readable medium having instructions thereon that when executed cause a processor to release a communications appliance from the media path portion of a communications session through a private branch exchange, the computer readable medium comprising:
- instructions for a communications appliance to issue a first invite command to a first end-point of a first communication session to release the communications appliance from a second communication session through the private branch exchange, the invite command comprising a port advertisement of the second communication session, the communications appliance intermediary to a private branch exchange and a plurality of end points on a computer network;
- instructions for the communications appliance to issue a second invite command to a second end-point to release the communications appliance from the first communication session through the private branch exchange, the second invite command comprising a port advertisement of the first communication session between the communications appliance and the first end-point;
- instructions for the private branch exchange to issue an ISDN release command to the first end-point of the communication session and the second end-point of the communication session to bridge the first end-point and the second-end point via the path; and
- wherein the communications appliance is released from the path, maintains control of the path for the duration of the communication session between the first end-point and second end-point after being released and the communications appliance accepts a new communication session between a third end-point and a fourth end-point using resources released from the path.

25. The computer readable medium of claim 24 further comprising instructions to establish a communications session between the first end-point and the second end-point through the private branch exchange, the communication session comprising RTP media.

26. The computer readable medium of claim 25 further comprising instructions to issue, by the communications appliance, a control command to the private branch exchange during the established communication session.

27. The computer readable medium of claim 24 wherein the instructions to issue an invite command comprise instructions to issue a SIP invite command to the first end-point.

* * * * *